US005452885A

United States Patent [19]

Beere

[11] Patent Number: 5,452,885

[45] Date of Patent: Sep. 26, 1995

[54] APPARATUS FOR VISE ACTUATION

[75] Inventor: Richard F. Beere, Waterford, Wis.

[73] Assignee: Beere Tool Company, Inc., Racine, Wis.

[21] Appl. No.: 225,619

[22] Filed: Apr. 11, 1994

[51] Int. Cl.[6] ........ B23Q 3/08

[52] U.S. Cl. ........ 269/32; 269/902

[58] Field of Search ........ 269/24, 27, 32, 269/902, 246, 250, 63, 70

[56] References Cited

U.S. PATENT DOCUMENTS

| | | |
|---|---|---|
| 1,388,836 | 8/1921 | Ripsch et al. . |
| 2,602,215 | 7/1952 | Moohl et al. . |
| 2,683,386 | 7/1954 | Doebeli . |
| 2,693,727 | 11/1954 | Olson . |
| 3,752,464 | 8/1973 | Csatlos ........ 269/32 |
| 4,949,943 | 8/1990 | Bernstein ........ 269/32 |
| 4,973,033 | 11/1990 | Sun ........ 269/32 |
| 4,995,599 | 2/1991 | Pfluger ........ 269/32 |
| 5,013,015 | 5/1991 | Fatheree ........ 269/91 |
| 5,172,896 | 12/1992 | Beere ........ 269/902 |

*Primary Examiner*—Robert C. Watson
*Attorney, Agent, or Firm*—Arthur J. Hansmann

[57] ABSTRACT

A vise for clamping workpieces of different sizes, and including two adjustable pieces, one of which gives a large adjustment and the other which gives a finer adjustment. A clamping jaw is included, and the adjustment pieces can be set so that there is desired clearance between the jaw and the workpiece prior to applying hydraulic force in the clamping action. Rotation restrictors apply to each of the rotationally adjustable members, and a spring returns the jaw to the unclamped or opened position.

19 Claims, 1 Drawing Sheet

APPARATUS FOR VISE ACTUATION

This invention relates to apparatus and method for vise actuation. More particularly, it relates to providing a vise which can be manually adjusted for the clamping jaw displacement and which is then fluid actuated for clamping.

BACKGROUND OF THE INVENTION

The prior art is already aware of vises which are used in the workplace for clamping workpieces which can then be worked upon. In those vises, there is commonly an anvil or V-block and a movable jaw moves toward and away from the V-block for clamping and then releasing the workpiece relative to the vise. The movement of the jaw is commonly achieved by threaded members, and also the jaw is moved by means of fluid power such as air or hydraulic sources.

U.S. Pat. No. 2,602,215 shows a clamp or vise which has both the threaded member and the fluid actuator for controlling the clamping jaw. Likewise, U.S. Pat. Nos. 2,683,386 and 2,693,727 show the combination of threaded members and a fluid actuator controlling the clamping mechanism.

The present invention differs from the prior art in that it provides a vise which has the combination of the manual or threaded adjustment and also has the fluid actuator and the vise can be set upon a work table and all of the adjustments can be made from above and can be made in large or small increments, in two different adjustments of the mechanical or threaded portion thereof. That is, the threaded adjustment is releasably restrained by stops which respectively hold the two threaded members in selected and set positions, and thereby each one can be held while the other is being adjusted. As mentioned, one of the adjustment members presents a large or substantial adjustment in one maneuver, and the other of the adjustment members presents a smaller or finer adjustment in one maneuver.

Still further, in this instance it is significant that the aforementioned objectives and claimed subject matter of this invention are achieved by a vise which has a minimum number of parts and which is therefore more reliable and accurate and is easy to manufacture, all compared to aforementioned prior art disclosures.

With the throw or amount of displacement adjusted for the movable vise jaw, then the fluid pressure can be applied to move the jaw to the clamping position. Prior to applying the fluid pressure, the jaw has been adjusted to a minimal clearance relative to the workpiece, and thus the jaw moves only a minimal amount when the fluid pressure is applied. In this respect, the jaw clamping action is of minimal time, the operator is not capable of having a finger positioned between the workpiece and the jaw because the space is too narrow, and the jaw will not apply a damaging or excessive force on the workpiece because the jaw is moving only that minimal amount.

That is, the vise of this invention can be secured to a work table, and both the aforementioned mechanical adjustments can be made above the vise, and the two adjustable members are respectively releasably secured in their adjusted positions and remain there until the operator resets them. Also, a spring automatically returns the jaw to the selected open position or clearance relative to the workpiece, and the hydraulic mechanism strokes the jaw to the closed position in the minimal movement of the jaw. Further, all of the moving parts are sealed relative to the vise base, and no special coverings or housings are required for protecting the moving parts from debris, though those moving parts are free of debris contamination.

The invention pertains to both the apparatus of the parts of the vise itself and also to the method of mechanically manuevering a vise and subsequently applying fluid pressure, all for achieving the minimal and desirable stroking and arrangement, as aforementioned.

DETAILED DESCRIPTION OF THE PREFERRED APPARATUS AND METHOD

Figure 2:
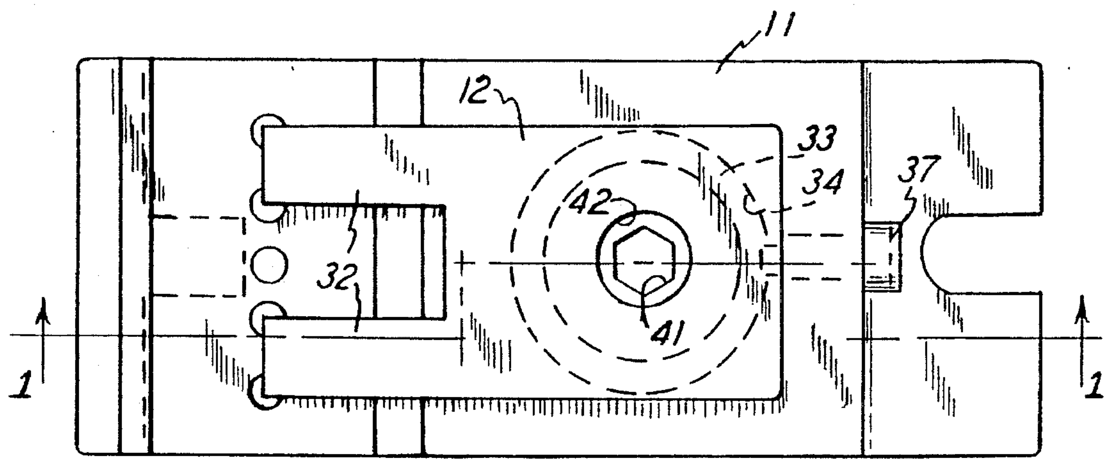
FIG. 2 is a top plan view of FIG. 1, but for clarity, certain parts are removed.

The description will cover both the method and apparatus, and specific reference will be made to the drawings which show a standard flat top or machine table 10 onto which the vise base 11 of this invention is secured by bolts 15. The point is that the vise, as shown, extends upwardly from the table 10 and only thereabove, and all of the adjustments or controls therefore are available from the top of the vise.

The base 11 movably supports a clamping jaw 12 which clamps onto workpieces of various diameters, such as large piece 13 or the small piece 14, both of which are shown in dot-dash lines. A V-block 16 is supported on the base 11 and has downwardly facing shoulders 17 which bear downwardly on the base upwardly facing shoulders 18 to therefore secure the V-block 16 which upwardly supports the workpieces 13 and 14, in turn. Thus the base has an opening 19 which slidably receives the V-block 16 for stabilizing the block which can also be secured to the base by means of a clamping screw 21 extending through the V-block 16 and into the base 11.

The base 11 has a first circular opening 22 in the lower portion thereof, and an upstanding standard or pedestal 23 is rotatably received in the circular opening 22. A plug 24 is threaded into the base 11 and upwardly supports a compression spring 26 which is received in a circular opening 27 in the standard 23. Thus the spring 26 urges the standard 23 upwardly to where an upwardly facing annulus 28 on the standard 23 bears against the downwardly facing annulus 29 on the base 11. That is, the upward and ready position of the standard 23 is prior to the actuation of the vise for commencing the clamping action of moving the jaw 12 downwardly onto one of the workpieces supported on the V-block 16.

Figure 1:
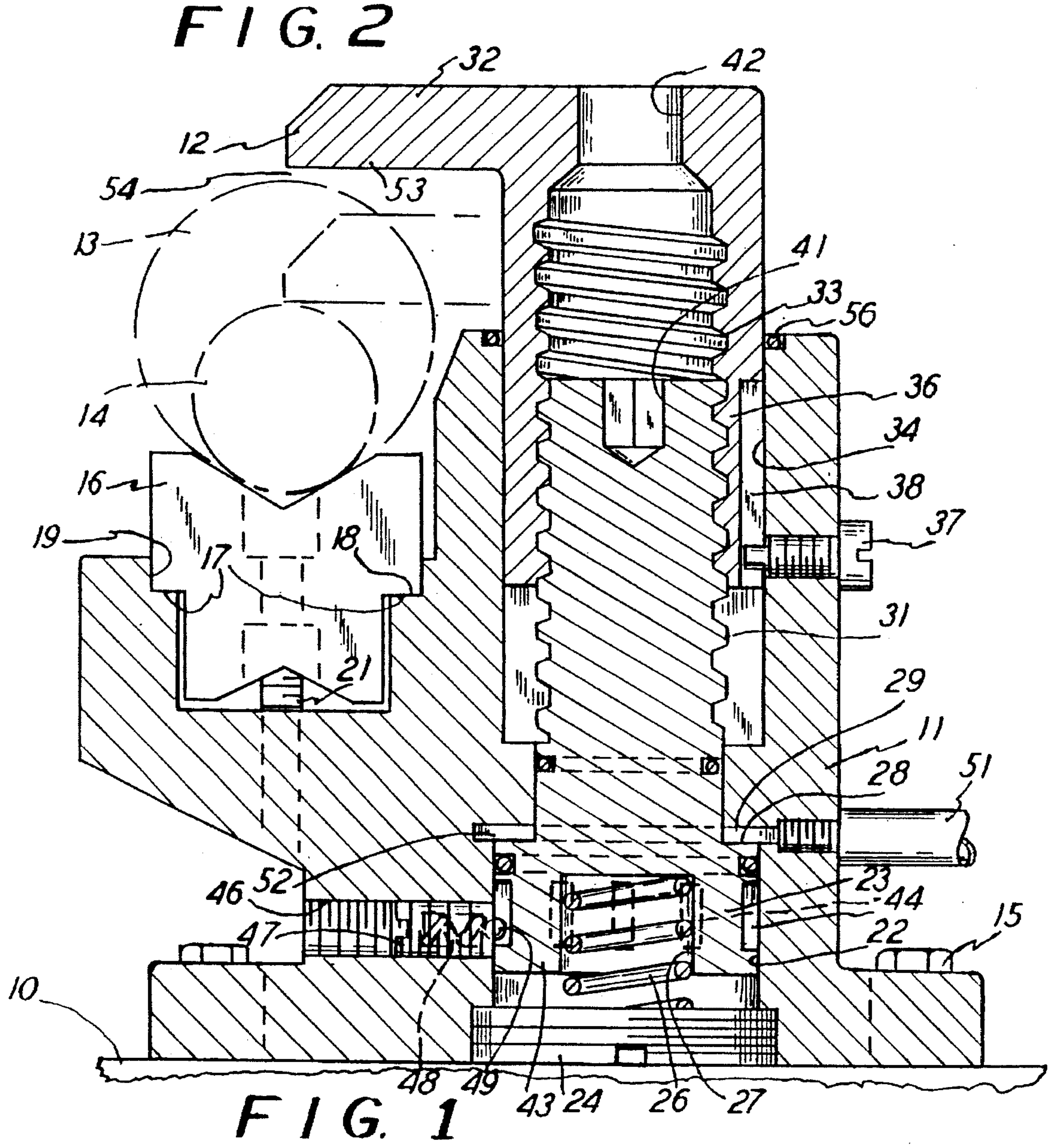
FIG. 1 is a sectional view of a preferred embodiment of this invention and is taken along the line 1—1 of FIG. 2.

The upper end of the standard 23 has threads 31 extending throughout its upper end and virtually its upper axial length, as viewed in FIG. 1. The jaw 12 has an offset finger 32 and it has a threaded opening 33 arranged so that the threads in the opening 33 are in mesh with the standard's threads 31, as shown in FIG. 1. Also, the base 11 has a circular opening 34, and the jaw 12 has its lower end 36 cylindrical and snugly received within the circular opening 34 to be rotatable therein. A restraining screw 37 extends through the base 11 and into a vertical slot 38 in the jaw extent 36 and thus guides the jaw 12 in up and down sliding motion in the opening 34 without permitting any rotation of the jaw 12 in the opening 34. However, upon retraction of the screw 37, the jaw 12 is free to rotate in the opening 34, and it would of course rotate in one complete turn or 360 degrees so that the offset fingers 32 are in the centrally aligned position as shown in FIGS. 1 and 2 in all positions of vise operation.

With that one turn of rotation of the jaw 12, the standard 23 is held non-rotatable and thus the jaw 12 moves vertically, either up or down, depending upon direction of rotation, and moves in accordance with the threaded relationship between the jaw 12 and the standard 23. That movement is noted to be a rough or large movement or adjustment of elevation of the jaw 12 relative to the remainder of the vise. Again, that adjustment is made from the top of the vise, and one need not maneuver from the side or even underneath the vise in order to make the adjustment mentioned.

When it is desired to make a smaller adjustment than that which is achieved by one full rotation of the jaw 12, then rotation of the standard 23 in small increments is achieved and that again imposes a threaded action between the standard 23 and the jaw 12 to adjust the vertical positioning of the jaw 12, as desired. To achieve that, the upper end of the standard 23 has a tool opening 41, and likewise the jaw 12 has an opening 42 aligned with the opening 41 so that a tool, such as an Allen wrench, can be inserted into the opening 41 and thus the standard 23 can be rotated in either clockwise or counter clockwise direction for incremental raising and lowering of the jaw 12 which is then being held against rotation by means of the screw 37 and is therefore permitted only to achieve the vertical adjustment being mentioned. Therefore, the base openings 22 and 34 are coaxial, and likewise the longitudinal axes of the standard 23 and the jaw 12, that is the axes of the threads 31 and 33 are coaxial.

To assure non-rotation of the standard 23 when the non-rotation is desired, the standard 23 has a lower piston end 43 which has eight vertical slots 44 extending around the circumference thereof, according to the five slots shown in FIG. 1 and that would of course be on the far half of the piston 43. An opening 46 in the base 11 receives a screw plug 47 which supports a compression spring 48 which in turn positions a ball 49 into the adjacent one of the eight slots or notches 44. In that manner, the ball 49 retains the standard 23 against rotation, but only up to a limited force which can be overcome by the intentional and thus manual rotation of the standard 23 through actuation by the tool in its tool opening 41, as described. The arrangement is such that the ball 49 will restrain the standard 23 from rotation when the jaw 12 is being rotated, as described, but the ball 49 will be released from the appropriate notch 44 when the standard 23 is being rotated by means of the tool in its tool opening 41.

Accordingly, the eight notches 44 provide for intentional and incremental one-eighth rotational adjustment of the standard 23 so that the fine or smaller adjustment of vertical positioning of the jaw 12 can be achieved by rotating the standard 23 from notch to notch relative to the ball 49.

A hydraulic line 51 is connected into the base 11 and extends to a location between the shoulders 28 and 29 and thus into the ,annulus 52. With hydraulic pressure in the annulus 52, the standard 23 is forced downwardly against the spring 26, and thus the jaw 12 is also drawn downwardly and will thereby clamp on the workpiece supported in the V-block 16. An O-ring seal is shown immediately above the annulus 52 and also an O-ring seal is shown immediately below the annulus 52 for sealing hydraulic fluid therebetween and thus have it effective only on the piston portion 43 of the standard 23.

In operation, the jaw 12 and/or the standard 23 are rotated so that the jaw fingers 32 are of a specific positioning relative to the V-block 16, and this would also be relative to the size of the workpieces 13 or 14 supported in the V-block 16. The objective is achieve only a minimal clearance between say the workpiece 13 and the lower clamping surface 53 of the jaw 12, and that clearance is designated 54. Either or both of the heretofore described manual or threaded adjustments may be imposed in the vise in order to achieve the desired or minimal clearance 54 prior to clamping. Subsequently, application of hydraulic fluid into the compression chamber 52 will cause the jaw 12 to move downwardly onto the workpiece 13 in that minimum stroke or throw distance 54. In that manner, there is a quick action in the vise; the operator is not likely to get a finger caught in the vise, and there is no tremendous impact on the workpiece because the stroke is very short and clamping action is achieved before full force of hydraulic pressure is exerted.

With the aforementioned, the apparatus and method will be apparent to one skilled in the art. Further, the jaw fingers 32 and the retaining screw 37 are on diametrically opposite sides relative to the cylindrical opening 34, and thus the fingers 32 are always properly positioned when the screw 37 is extending into the slot 38. Of course rotation of the standard 23 does not affect the alignment of the fingers 32, and thus the standard 23 can receive its incremental rotational adjustment mentioned.

A dirt seal 56 surrounds the jaw 12 and is in the base 11 to preclude dirt from entering the opening 34. That assures that the jaw 11 can be rotated on the standard 23 without rotation of the standard 23 which is then being held by the spring-loaded ball 49, as mentioned.

The V-block 16 is shown to be an invertible member, and it always bears downwardly on the base shoulders 18, and it has the two V's, as shown, and the plane through the apex of the V's is in line with the end of the jaw fingers 32, all for the geometric relationship mentioned. Also, the ball 49 and the notches 44 comprise detent means, and the notches extend for sufficient axial length so that the standard 23 can move up and down within the stroke described and required herein.

With the offset fingers 32, the jaw 12 is adjusted by only each full rotation thereof. However, the smaller adjustment as defined herein, is achieved by each one-eighth rotation of the standard 23.

Rotational restrictors 37 and 49 assure the rotationally adjusted selections.

What is claimed is:

1. A vise comprising a base, a jaw movably mounted on said base for clamping a workpiece, an actuator on said base and connected to said jaw for movement of said jaw, said actuator including two threadedly interconnected telescoping members supported on said base and with one of said members being integral with said jaw, a releasable guide interconnected between said base and said one of said members and releasably restraining rotation of said One of said members relative to said base, said base having two bores therein respectively rotatably receiving each of said members, said members being arranged in said bores to be separately rotatable therein and with said one of said members extending beyond the confines of said base and being telescopically extendable and contractable relative to the other of said telescoping members upon relative rotation of either of said members, and said actuator including a fluid powered displacer operatively associated with said telescoping members for displacing said telescoping members in the direction along their telescoping axis.

2. The vise as claimed in claim 1, including a V-block supported on said base offset to one side of said members, said jaw extending offset from said one of said members, said guide consisting of a pin and a slot receiving said pin and being positioned to align said jaw on the plane which bisects the apex of said V-block, whereby said one of said members is rotatable in one full turn for telescopic adjustment of said members and for engagement of said pin and slot of said guide.

3. The vise as claimed in claim 2, including an indexer operatively associated between said other of said members and said base and being arranged to restrict rotation of said other of said members upon the rotation of said one of said members.

4. The vise as claimed in claim 3, wherein said indexer is releasable in response to applying a rotational force to said other of said members, to thereby rotate said other of said members relative to said one of said members.

5. The vise as claimed in claim 1, wherein said fluid power displacer includes a piston, a spring disposed between said base and said piston for effecting displacement of said members along said telescoping axis in a direction away from said base, and said fluid power displacer includes a fluid cavity arranged to receive fluid pressure on said piston to force said piston against said spring in a direction opposite said direction away from said base.

6. A vise comprising a base, a jaw for clamping a workpiece, an actuator supported on said base and said jaw being connected thereto for movement of said jaw, said actuator including two threadedly interconnected telescoping members with one of said members being integral with said jaw, a releasable guide interconnected between said base and said one of said members and releasably restraining rotation of said one of said members relative to said base, said members being arranged on said base to be separately rotatable thereon and with one of said members extending beyond the confines of said base and being telescopically extendable and contractable relative to the other of said telescoping members upon relative rotation of either of said members, and said actuator including a fluid-powered displacer operatively associated with said telescoping members for displacing said telescoping members in unison along their telescoping axis.

7. The vise as claimed in claim 6, including a V-block supported on said base offset to one side of said members, said jaw extending offset from said one of said members, said guide consisting of a pin and a slot receiving said pin and being positioned to align said jaw on the plane which bisects the apex of said V-block, whereby said one of said members is rotatable in one full turn for telescopic adjustment of said members and for engagement of said pin and slot of said guide.

8. The vise as claimed in claim 7, including an indexer operatively associated between said other of said members and said base and being arranged to restrict rotation of said other of said members upon the rotation of said one of said members.

9. The vise as claimed in claim 8, wherein said indexer is releasable in response to applying a rotational force to said other of said members, to thereby rotate said other of said members relative to said one of said members.

10. The vise as claimed in claim 6, wherein said fluid power displacer includes a piston, a spring disposed between said base and said piston for effecting displacement of said members along said telescoping axis in a direction away from said base, and said fluid power displacer includes a fluid cavity arranged to receive fluid pressure on said piston to force said piston against said spring in a direction opposite said direction away from said base.

11. A vise comprising a base, a jaw for clamping a workpiece, an actuator supported on said base and said jaw being connected thereto for movement of said jaw, said actuator including two threadedly interconnected telescoping members with one of said members being integral with said jaw, said members being arranged on said base to be separately rotatable thereon and with said one of said members extending beyond the confines of said base and being telescopically adjustably extendable and contractable relative to the other of said telescoping members upon relative rotation of either of said members, said members being rotatively associated for a rough telescoping adjustment in response to rotation of said one of said members, a rotational indexer operatively associated between said base and said other of said members for incremental rotation of said other of said members relative to said one of said members for fine telescoping adjustment of said members, and said actuator including a fluid powered displacer operatively associated with said telescoping members for displacing said telescoping members in unison along their telescoping axis.

12. The vise as claimed in claim 11, wherein said fluid powered displacer includes a piston, a spring disposed between said base and said piston for effecting displacement of said members along said telescoping axis in a direction away from said base, and said fluid power displacer includes a fluid cavity arranged to receive fluid pressure on said piston to force said piston against said spring in a direction opposite said direction away from said base.

13. The vise as claimed in claim 11, wherein said rotational indexer includes a detent mechanism operatively associated between said base and said other of said members and having index stations spaced around said other of said members for releasably restraining said other of said members in rotated indexed positions of indexing for effecting said fine telescoping adjustments.

14. The vise as claimed in claim 13, including a V-block supported on said base offset to one side of said members, a releasable guide interconnected between said base and said one of said members and releasably restraining rotation of said one of said members, said jaw extending offset from said one of said members, said guide consisting of a pin and a slot receiving said pin and being positioned to align said jaw on the plane which bisects the apex of said V-block whereby said one of said members is rotatable in one full turn for telescopic adjustment of said members and for engagement of said pin and slot of said guide.

15. A vise comprising a base, a jaw for clamping a workpiece, an actuator supported on said base and said jaw being connected thereto for movement of said jaw, said actuator including two relatively extendable members with one of said members being integral with said jaw, means for adjustably moving said members separately relative to said base and with one of said members extending beyond the confines of said base and being extendable and contractable relative to the other of said members upon relative movement of either of said members, said means also being arranged for moving said members in respective relative amounts of large and small, and said actuator including a fluid-powered displacer operatively associated with said members for displacing said members in unison.

16. The vise as claimed in claim 15, wherein said means for adjustably moving said members is related to each of said members and is accessible from a common location adjacent said jaw.

17. The vise as claimed in claim 15, including means releasably in contact with each of said members for restraining rotation of said members.

18. A vise comprising a base having a surface for support on a table top to stand upright thereon, a V-block on said base, a threaded standard rotatably supported in said base and extending upwardly away from said surface, a jaw threaded onto said standard and extending over said base and having a portion threadedly telescoped onto said standard for extension and contraction relative to said standard, said jaw including an offset portion extending over said V-block for clamping a workpiece onto said V-block, said jaw being arranged for one full rotational adjustment of telescopic movement on said standard and with said standard being arranged for rotational adjustments in increments of rotation less than one full turn for telescopic rotational adjustment of said jaw relative to said base, and hydraulic means operative on said standard for movement thereof relative to said base in the clamping action of said jaw.

19. The vise as claimed in claim 18, including a spring operative on said standard to counter the movement of said hydraulic means.

* * * * *